United States Patent
Lin (10) Patent No.: US 7,995,495 B2
(45) Date of Patent: Aug. 9, 2011

(54) SYSTEM RELIABILITY EVALUATION METHOD FOR TRANSMISSION BY A SINGLE MINIMAL PATH IN TIME RESTRICTION

(75) Inventor: Yi-Kuei Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 85 days.

(21) Appl. No.: 12/458,525

(22) Filed: Jul. 15, 2009

(65) Prior Publication Data
US 2010/0142384 A1 Jun. 10, 2010

(30) Foreign Application Priority Data
Dec. 8, 2008 (TW) ............................... 97147596 A (51) Int. Cl.
*H04J 3/14* (2006.01)
(52) U.S. Cl. .................................................... 370/252
(58) Field of Classification Search .......... 370/250, 370/252
See application file for complete search history.

(56) References Cited

U.S. PATENT DOCUMENTS
6,560,584 B1 * 5/2003 Afshar et al. .................. 706/21
2009/0323539 A1 * 12/2009 Wang et al. .................. 370/248
* cited by examiner

*Primary Examiner* — Albert T Chou
(74) *Attorney, Agent, or Firm* — Bacon & Thomas, PLLC (57) ABSTRACT

A system reliability evaluation method for transmission by a single minimal path in time restriction is disclosed. The single minimal path includes plural arcs between a start node and a terminal node in a flow network. The method includes the steps of providing a virtual network in a computer for simulating the flow network; inputting a transmission requirement, a budget restriction and a time restriction; distributing the transmission requirement in a minimal path of the virtual network for getting a capacity vector to represent the flow distribution of the flow network; under the capacity vector, checking if the transmission cost satisfy the budget restriction for sending the transmission requirement in the minimal path; thereby, defining a lower boundary vector; and computing a system reliability that is a probability of any one capacity vector being lager than or equal to the lower boundary vector.

7 Claims, 4 Drawing Sheets

SYSTEM RELIABILITY EVALUATION METHOD FOR TRANSMISSION BY A SINGLE MINIMAL PATH IN TIME RESTRICTION

BACKGROUND OF THE INVENTION (1) Field of the Invention

The invention relates to a system reliability evaluation method for transmission by a single minimal path in time restriction, and especially relates to a system reliability evaluation method for transmission by a single minimal path of a stochastic-flow network in time restriction.

(2) Description of the Prior Art

With diversification of commodities and information services, various kinds of flow networks which value transmission time has emerged, such as computer system, telecommunication system, logistic system and transportation system, etc. Basically, the flow network is composed by plural nodes and arcs between nodes.

For effectively managing the flow network, the shortest path problem has attracted great attention of researchers in information science, network layout and operation research. The problem is to find a path in the network to send a given amount of data (goods or commodities) from a start node to a terminal node with minimum transmission time. Since then, several related problems are proposed gradually for different applications, such as least cost path problem, largest capacity path problem, shortest delay path problem, etc. Later, the quickest path problem is proposed to seek a path for sending a given amount of data with minimum transmission time without loops.
loops.

Currently, in most researches of the quickest path problem, it is assumed that each arc has two attributes: capacity and lead time, and both are deterministic. However, due to failure, maintenance, occupation, etc., it is more reasonable that the capacity of each arc is stochastic in real-life flow network. Such a network is named a stochastic-flow network.

The stochastic-flow network is much more complex at controlling transmission time. For example, in the computer system, each computer (or switch) represents a node, and each transmission line represents an arc. The transmission line is composed by plural real-life network lines (such as T1 cable or E1 cable), and each network line has two cases of normal and failure. Thus each transmission line has plural states, and capacity of each arc has plural values accordingly.

The capacity of the stochastic-flow network is not deterministic, so the transmission time is not a fixed number and the technology for evaluating deterministic capacity becomes unrealistic. Hence, it is an important issue to conduct the system reliability evaluation method for a stochastic-flow network.

SUMMARY OF THE INVENTION

Accordingly, the object of the invention is to provide a system reliability evaluation method for transmission by a single minimal path in time restriction. With setting the restriction of the transmission time and the transmission cost between a start node and a terminal node in a flow network, calculating the probability satisfied by the restriction to evaluate the quality of service for customer.

In one aspect, the invention provides a system reliability evaluation method for transmission by a single minimal path in time restriction, using a computer executing a reliability evaluation software to evaluate a system reliability. The computer contains an input unit, an operation unit and an output unit. The reliability evaluation software provides a virtual network for simulating the flow network. The virtual network has a start node, a terminal node and plural arcs between nodes for constituting plural minimal paths.

The steps of above system reliability evaluation method include: inputting a transmission requirement, a budget restriction and a time restriction from the input unit by users; distributing the transmission requirement in one of the minimal paths of the virtual network; according to the transmission requirement, the time restriction and a transmission time which is smaller than or equal to the time restriction, calculating a maximum flow of each arc of the minimal path per unit time accordingly, regarded as a capacity of the arc; defining a capacity vector composed by the capacities of the arcs, the capacities which are stochastic to correspond with the flow distribution state of the flow network; executing a budget check by the operation unit to check if a transmission cost satisfies the budget restriction for sending the transmission requirement in the minimal path; defining the capacity vector as a lower boundary vector when the transmission cost and the transmission time of the minimal path are less than or equal to the budget restriction and the time restriction respectively; calculating the probability that the capacity vector is larger than or equal to the lower boundary vector, called a system reliability of the flow network; and displaying the system reliability on the output unit.

In another aspect, the steps of distributing the transmission requirement in the minimal path include: selecting the minimal paths of the virtual network, wherein each minimal path is required to be an ordered sequence of the arcs between the start node to the terminal node without loops; calculating a flow of each minimal path; and transferring the flow of each minimal path into the current capacity of each arc. The steps of calculating the flow of the minimal path include: providing a lead time for each arc of the minimal path; with the transmission time lower than or equal to the time restriction, calculating the flow of the minimal path, wherein the transmission time equals to the sum of the lead time and the transmission requirement divided by the flow of the minimal path; and judging if the lower boundary vector exists, when the flow of the minimal path is smaller than a maximum capacity of the minimal path.

In yet another aspect, the steps of the budget check include: calculating the transmission cost of sending the transmission requirement in the minimal path; comparing the numbers of the transmission cost and the budget restriction; and according to the comparison result, judging if the lower boundary vector of the minimal path exists.

The methods of above calculating the system reliability can be inclusion-exclusion rule, disjoint-event method or state-space decomposition.

In still another aspect, above system reliability evaluation method further comprising: defining an expectation of the transmission ability of the flow network as product of the system reliability and the transmission requirement, and defining an expectation of the transmission time of the flow network as product of the system reliability and the time restriction.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
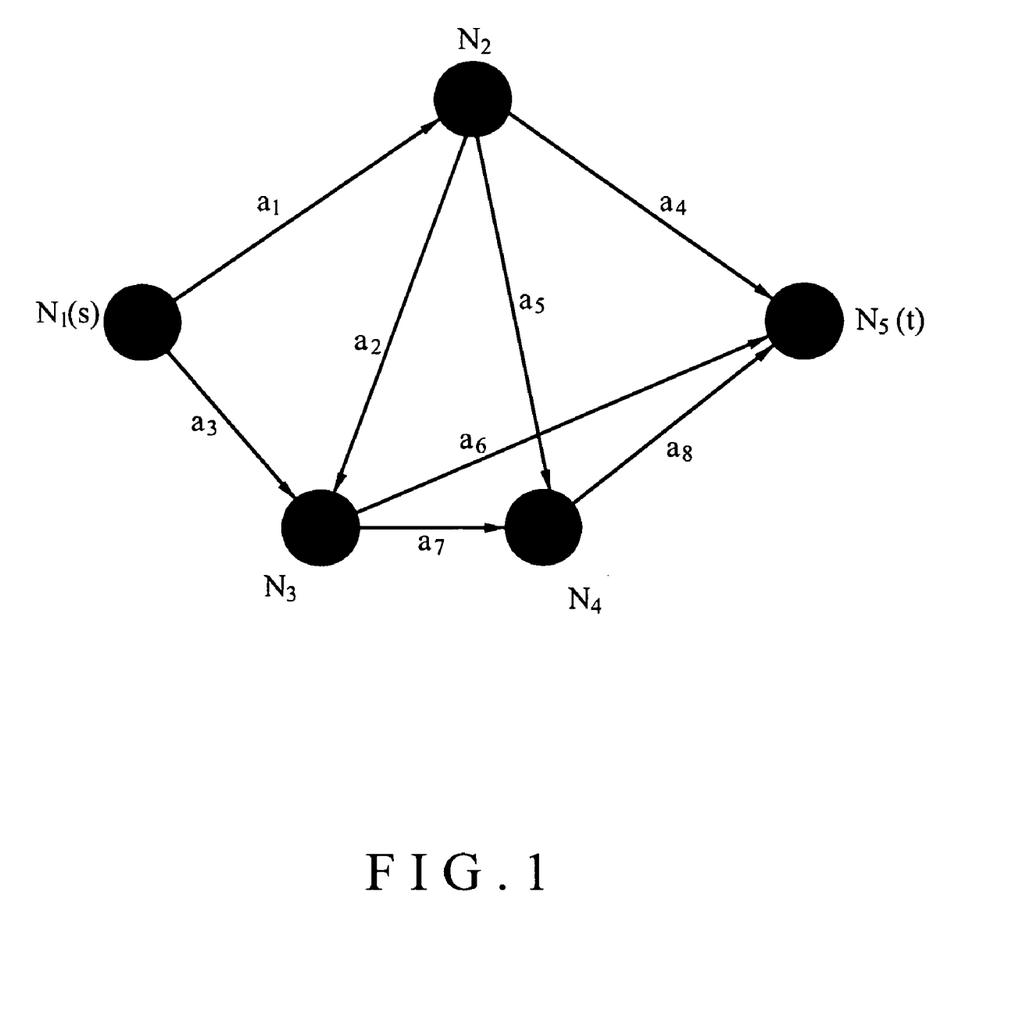
FIG. 1 is a schematic view of an embodiment of the virtual network according to the present invention.

Refer to FIG. 1 for a stochastic-flow network with a start node s and a terminal node t, where N stands for all nodes, ai for all arcs, each arc ai connecting two nodes N. The flow network can be an information network, a telecommunication network, a logistic network or a transportation network.

The present invention provides a system reliability evaluation method for transmission by a single minimal path in time restriction. The system reliability means the probability that the stochastic-flow network can send a specific amount of data from a single start node to a single terminal node by a single minimal path within a given time under a budget restriction. From the point of quality management, it is the probability of satisfying transmission requirement in a specific time, which can be treated as a performance index of the service system.

For evaluating the system reliability of a real-life flow network, a computer is used in the present invention to run a reliability evaluation software which provides a network model for simulating the real-life flow network.

Figure 2:
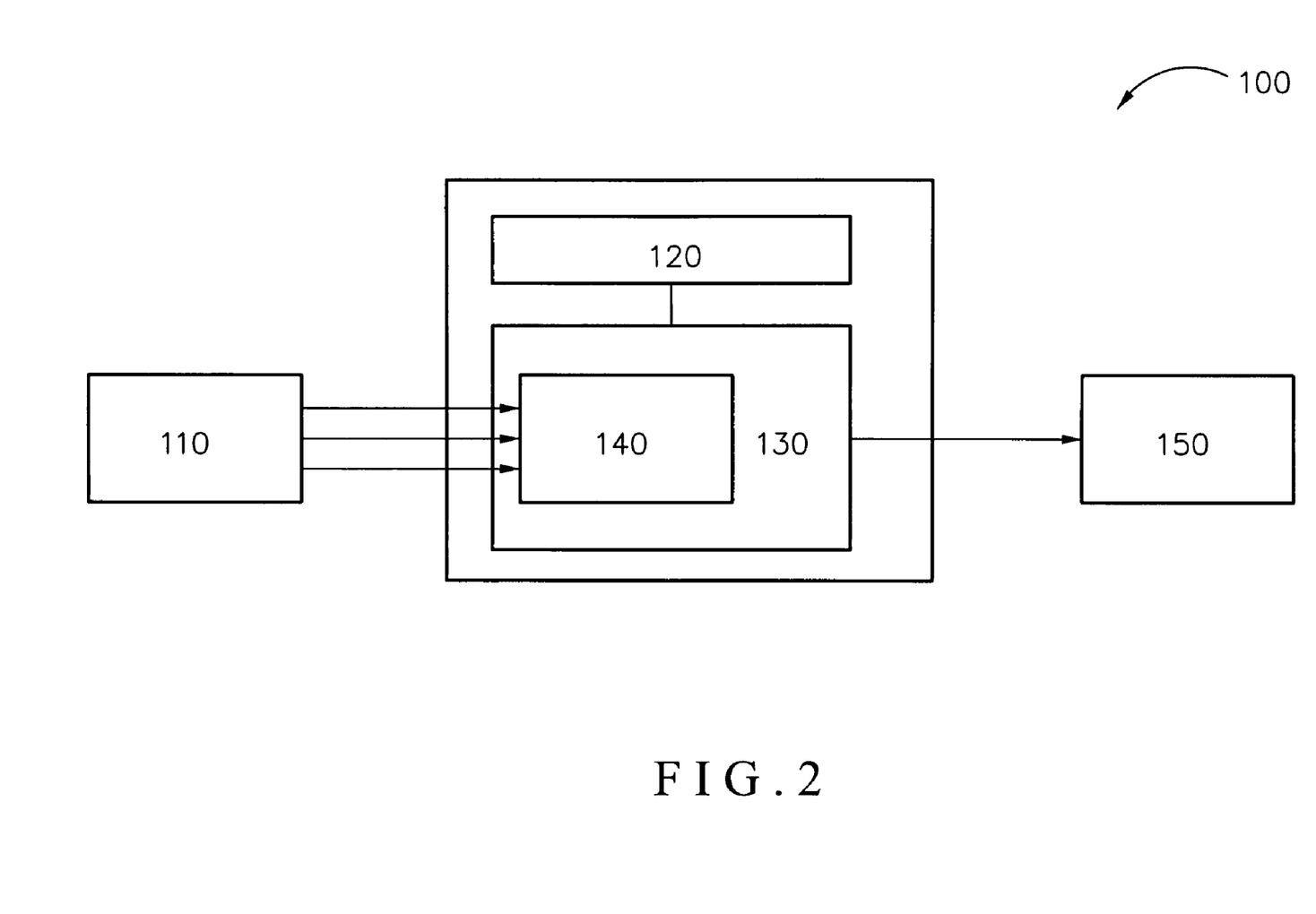
FIG. 2 is a block diagram of the hardware executing an embodiment of the system reliability evaluation method for transmission by a single minimal path in time restriction according to the present invention.

Refer to FIG. 2 for a block diagram of the hardware in the system reliability evaluation method for transmission by a single minimal path in time restriction according to the present invention. A computer 100 has an input unit 110, an operation unit 120, a storage unit 130 and an output unit 150. The input unit 110 is a keyboard or a handwriting input device. The operation unit 120 is a central processing unit (CPU). The storage unit 130 is a hardware electrically connected to the input unit 110, the operation unit 120 and the output unit 150. A reliability evaluation software 140 is installed in the hardware. The output unit 150 is a display or a printer.

Figure 3:
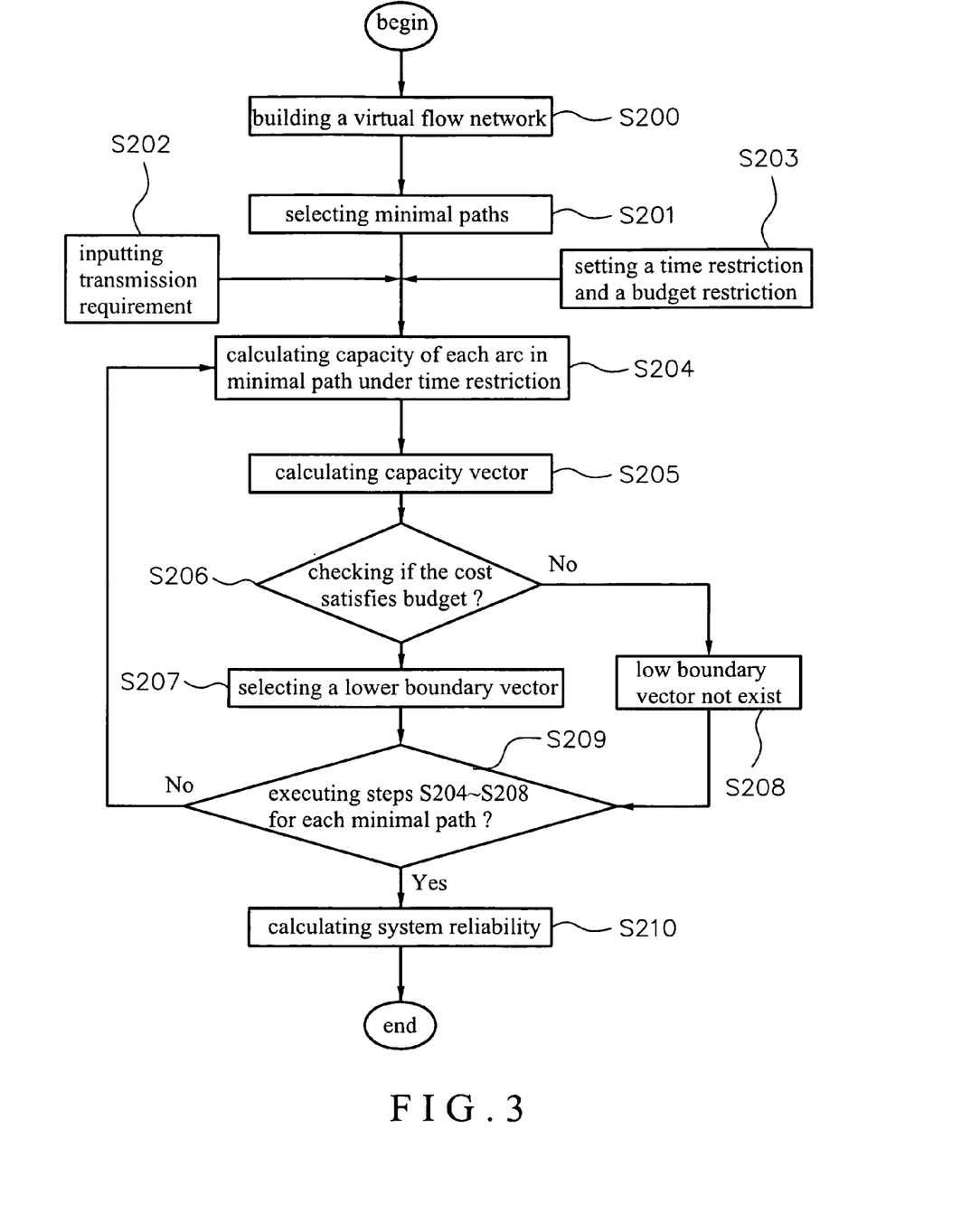
FIG. 3 is a flow chart of the software executing an embodiment of the system reliability evaluation method for transmission by a single minimal path in time restriction according to the present invention.

Refer to FIG. 3 for a flow chart of the system reliability software 140 executing the system reliability evaluation method for transmission by a single minimal path in time restriction according to the present invention. The method includes the steps of:

Step (S200): building a virtual network to correspond with the real-life flow network in the network model according to number of the nodes N and the arcs ai in the real-life flow network.

Step (S201): supposing that the network is a binary-state system, and each arc has two cases of normal and failure. All minimal paths $Pj=\{aj1, aj2, \ldots, a_{j_{n_j}}\}$ between the start node s to the terminal node t in the virtual network are selected. The minimal path is required to be an ordered sequence of the arcs ai between the start node s to the terminal node t without loops.

Step (S202): inputting the transmission requirement d of goods, commodities or data from the input unit 110 by user.

Step (S203): receiving a time restriction T and a budget restriction B set by the user.

Step (S204): given the transmission requirement d and the time restriction T, investigating flow distribution of the flow network under the minimal path, distributing the transmission requirement d in a minimal path Pj of the virtual network between the start node s and the terminal node t for calculating the flow in the minimal path Pj under the time restriction T, and then calculating a maximum flow of each arc ai per unit time accordingly, which is regarded as a capacity xi of the arc ai. In this way, the flow distribution of each minimal path Pj is obtained respectively.

Step (S205): getting a capacity vector $X \equiv (x1, x2, \ldots, xn)$ to represent the current state of each arc ai of the minimal path Pj. The capacity vector X is composed by the capacities x1, x2, . . . , xn of the arcs. The capacities are stochastic to correspond with the flow distribution of the flow network.

Step (S206): under the capacity vector X of certain flow distribution, the operation unit checking if the transmission cost F(Pj) satisfies the budget restriction B for sending the transmission requirement d in the minimal path.

Step (S207): defining the capacity vector X selected by the step S206 as a lower boundary vector, which makes the flow network satisfy the lowest boundary of the time restriction T and the budget restriction B. Any capacity vector larger than the lower boundary vector can satisfy the requirement of sending the transmission requirement d under the time restriction T and the budget restriction B. In other words, from the capacity vectors X relative to the flow distribution, all lower boundary vectors lower than or equal to the time restriction T and the budget restriction B can be selected.

Step (S208): the capacity vector X not selected by step (S206) being unqualified for the candidate of the lower vector.

Step (S209): judging if the process from step (S204) to step (S208) is executed on each minimal path, yes for performing step (S210), no for executing this process for the next minimal path.

Step (S210): due to many possibilities of the lower boundary vector calculated in step (S207), applying inclusion-exclusion rule, disjoint-event method or state-space decomposition to calculate the probability of the capacity vector X larger than or equal to the lower boundary vector, which is the probability that the flow network satisfies the transmission requirement d, called the system reliability, represented by $R_{d,T}$.

Additionally, an expectation of transmission ability of the flow network is defined as product of the system reliability $R_{d,T}$ and the transmission requirement d, and an expectation of transmission time of the flow network is defined as product of the system reliability $R_{d,T}$ and the time restriction T. Thus, after calculating the system reliability $R_{d,T}$, $$\sum_d R_{d,T} \times d$$

is the expected transmission ability of the flow network and $$\sum_T R_{d,T} \times T$$

is the expected transmission time of sending d units of data under the time restriction T.

Refer to FIG. 1 for a benchmark network to illustrate the proposed algorithm. The algorithm and an embodiment are presented in following text.

Let $G \equiv (N, A, L, M, C)$ denotes a stochastic-flow network where N denoting the set of nodes, $A \equiv \{a_i | 1 \leq i \leq n\}$ denoting the set of arcs, $L \equiv (l_1, l_2, \ldots, l_n)$ with $l_i$ denoting the lead time of ai and $M \equiv (M_1, M_2, \ldots, M_n)$ with $M_i$ denoting the maximal capacity of ai, $C \equiv \{c_i | 1 \leq i \leq n\}$ with $c_i$ denoting the transmission cost of arc ai per unit of data. The capacity is the maximal number of data sent through the medium (an arc or a path) per unit of time. In the stochastic-flow network, the current capacity of arc ai is stochastic, denoted by xi, taking values $0 = b_{i1} < b_{i2} < \ldots < b_{ir_i} = M_i$, where $b_{ij}$ is an integer for $j=1, 2, \ldots,$ ri. The vector $X \equiv (x_1, x_2, \ldots, x_n)$ denotes the capacity vector.

If flow in the flow network can satisfy the transmission requirement d and the capacity of the arcs under time restriction and budget restriction at the same time, the transmission of the flow network is defined as a success.

In this flow network, assuming each node N is perfectly reliable, the capacities of different arcs are statistically independent and all transmission requirement such as data and commodities are sent through one minimal path. The comparisons of vectors are:

$Y \geq X$ (y1, y2, . . . , yn) $\geq$ (x1, x2, . . . , xn): yi $\geq$ xi, for each i=1, 2, . . . , n.

$Y > X$ (y1, y2, . . . , yn) $>$ (x1, x2, . . . , xn): $Y \geq X$ and yi$>$xi for at least one i.

Suppose that P1, P2, . . . , Pm are minimal paths of G from s to t. With respect to each $Pj = \{aj1, aj2, \ldots, a_{jn_j}\}$, the maximum capacity is $$\min_{1 \leq k \leq n_j} (M_{jk}).$$

Similarly, the maximum capacity under the capacity vector X is $$\min_{1 \leq k \leq n_j} (x_{jk}).$$

If d units of data are required to be transmitted through minimal path Pj under the capacity vector X and the budget restriction B, then the transmission time, denoted by $\Psi(d, X, B, Pj)$, is lower than or equal to the time restriction and equals to the sum of the lead time and the transmission requirement divided by the flow of the minimal path Pj, represented by:

$$\text{the lead time of } Pj + \left\lceil \frac{d}{\text{the capacity of } P_j} \right\rceil = \sum_{k=1}^{n_j} l_{jk} + \left\lceil \frac{d}{\min_{1 \leq k \leq n_j} x_{jk}} \right\rceil,$$

where $\lceil x \rceil$ is the smallest integer such that $\lceil x \rceil \geq x$. Any capacity vector X with $\Psi(d, X, B, Pj) \leq T$ means that the network can send d units of data from the start node s to the terminal node t within time restriction T under the capacity vector X and budget restriction B.

If X is a minimal capacity vector Xj such that the network can send d units of data within T units of time, then X is called a lower boundary vector. It is trivial that (i) $\Psi(d, X, B, Pj) \leq T$ and (ii) $Y < X$, $\Psi(d, X, B, Pj) > T$ for any capacity vector. $\Omega_j$ represents the set of the capacity vectors X and $\Omega_{j, min}$ represents the set of the lower boundary vectors. The system reliability $R_{d,T}$ is a probability $Pr\{X | \Psi(d, X, B, Pj) \leq T\}$ at this time.

Several methods such as inclusion-exclusion rule, disjoint-event method or state-space decomposition can be applied to calculate the system reliability $R_{d,T}$. Note that $Pr\{X \geq Y\} = Pr\{x1 \geq y1\} \times Pr\{x2 \geq y2\} \times \ldots \times Pr\{xn \geq yn\}$ if $Y = (y1, y2, \ldots, yn)$.

The algorithm to evaluate the system reliability is as follows:

Step1. For each minimal path $Pj = \{aj1, aj2, \ldots, a_{jn_j}\}$, find the minimal capacity vector $Xj = (x1, x2, \ldots, xn)$ such that the network sends d units of data within T units of time.

1. Find the minimal capacity h of minimal path Pj such that d units of data can be sent through minimal path Pj within T units of time. That is, find the smallest integer h such that $$\sum_{k=1}^{n_j} l_{jk} + \left\lceil \frac{d}{h} \right\rceil \leq T \tag{1}$$

2. If $$h \leq \min_{1 \leq k \leq n_j} (M_{jk})$$

then Xj can be obtained according to:

$$\begin{cases} x_{jk} = \text{the minimal capacity of } a_{jk} \text{ which is larger than or equal to } h; & k = 1, 2, \ldots, n_j \\ x_i = 0; & \text{other arcs} \end{cases} \quad (2)$$

Otherwise, Xj does not exist.

Step 2. For each minimal path Pj={aj1, aj2, ..., $a_{jn_j}$}, check if it satisfies the budget restriction B.

1. Calculate the transmission cost $$F(Pj) = \sum_{i=1}^{n_j}(d \cdot c_{ji})$$

of the minimal path Pj.

2. If F(Pj)>B, then the lower boundary vector Xj does not exist.

Step 3. If Xj exists, then Bj={X|X≧Xj}; Otherwise, Bj=ϕ. Then the system reliability is $$Pr\left\{\bigcup_{j=1}^{m} B_j\right\}$$

Step 1 and step 2 are alternative with each other. We use the benchmark network in FIG. 1 to illustrate the proposed algorithm. The capacity, budget, and the lead time of each arc are shown in Table 1. There are six MPs: P1={a1, a4}, P2={a1, a5, a8}, P3={a1, a2, a6}, P4={a1, a2, a7, a8}, P5={a3, a6} and P6={a3, a7, a8}. If 8 units of data are required to be sent from start to terminal within 12 units of time under 120 units of budget. Then all lower boundary vectors and the system reliability to meet such a requirement can be derived as follows:

TABLE 1

The arc data of FIG. 1

| Arc | Capacity | Probability | Lead time | Budget |
|---|---|---|---|---|
| a1 | 3* | 0.80 | 2 | 3 |
|    | 2 | 0.10 | | |
|    | 1 | 0.05 | | |
|    | 0 | 0.05 | | |
| a2 | 3 | 0.80 | 1 | 4 |
|    | 2 | 0.10 | | |
|    | 1 | 0.05 | | |
|    | 0 | 0.05 | | |
| a3 | 2 | 0.85 | 3 | 1 |
|    | 1 | 0.10 | | |
|    | 0 | 0.05 | | |
| a4 | 1 | 0.90 | 3 | 3 |
|    | 0 | 0.10 | | |
| a5 | 1 | 0.90 | 1 | 3 |
|    | 0 | 0.10 | | |
| a6 | 4 | 0.60 | 2 | 4 |
|    | 3 | 0.20 | | |
|    | 2 | 0.10 | | |
|    | 1 | 0.05 | | |

TABLE 1-continued

The arc data of FIG. 1

| Arc | Capacity | Probability | Lead time | Budget |
|---|---|---|---|---|
| a7 | 0 | 0.05 | 2 | 3 |
|    | 5 | 0.55 | | |
|    | 4 | 0.10 | | |
|    | 3 | 0.10 | | |
|    | 2 | 0.10 | | |
|    | 1 | 0.10 | | |
|    | 0 | 0.05 | | |
| a8 | 3 | 0.80 | 1 | 3 |
|    | 2 | 0.10 | | |
|    | 1 | 0.05 | | |
|    | 0 | 0.05 | | |

*Pr {the capacity of $a_1$ is 3} = 0.80.

Step 1:

1. The lead time of P1={a1, a4} is $l_1+l_4$=5. Then h=2 is the smallest integer such that $$\left(5 + \left\lceil \frac{8}{h} \right\rceil\right) \leq 12.$$

The maximal capacity of P1 is only 1. Hence, X1 does not exist.

2. The lead time of P2={a1, a5, a8} is $l_1+l_5+l_8$=4. Then h=1 is the smallest integer such that $$\left(4 + \left\lceil \frac{8}{h} \right\rceil\right) \leq 12.$$

The maximal capacity of P2 is only 1. Hence, x1=x5=x8=1 and xi=0 for others. So we obtain X2=(1,0,0,0,1,0,0,1).

3. The lead time P3={a1, a2, a6} is $l_1+l_2+l_6$=5. Then h=2 is the smallest integer such that $$\left(5 + \left\lceil \frac{8}{h} \right\rceil\right) \leq 12.$$

The maximal capacity of P3 is only 3. Hence, x1=x2=x6=2 and xi=0 for others. So we obtain X3=(2,2,0,0,0,2,0,0).

4. The lead time P4={a1, a2, a7, a8} is $l_1+l_2+l_7+l_8$=6. Then h=2 is the smallest integer such that $$\left(6 + \left\lceil \frac{8}{h} \right\rceil\right) \leq 12.$$

The maximal capacity of P4 is only 3. Hence, x1=x2=x7=x8=2 and xi=0 for others. So we obtain X4=(2,2,0,0,0,0,2,2).

5. The lead time P5={a3, a6} is $l_3+l_6=5$. Then h=2 is the smallest integer such that $$\left(5+\left\lceil\frac{8}{h}\right\rceil\right)\leq 12.$$

The maximal capacity of P5 is only 2. Hence, x3=x6=2 and xi=0 for others. So we obtain X5=(0,0,2,0,0,2,0,0).

6. The lead time P6={a3, a7, a8} is $l_3+l_7+l_8=6$. Then h=2 is the smallest integer such that $$\left(6+\left\lceil\frac{8}{h}\right\rceil\right)\leq 12.$$

The maximal capacity of P6 is only 2. Hence, x3=x7=x8=2 and xi=0 for others. So we obtain X6=(0,0,2,0,0,0,2,2)

Step 2:

1. The transmission cost of P2={a1, a5, a8} is F(P2)=8×(3+3+3)=72; F(P2)≦120. The lower boundary vector X2 of P2 may exist.

2. The transmission cost of P3={a1, a2, a6} is F(P3)=8×(3+4+4)=88; F(P3)≦120. The lower boundary vector X3 of P3 may exist.

3. The transmission cost of P4={a1, a2, a7, a8} is F(P4)=8×(3+4+3+3)=104; F(P4)≦120. The lower boundary vector X4 of P4 may exist.

4. The transmission cost of P5={a3, a6} is F(P5)=8×(1+4)=40; F(P5)≦120. The lower boundary vector X5 of P5 may exist.

5. The transmission cost of P6={a3, a7, a8} is F(P6)=8×(1+3+3)=56; F(P6)≦120. The lower boundary vector X6 of P6 may exist Step 3: Five lower boundary vectors are generated by last step: X2=(1,0,0,0,1,0,0,1), X3=(2,2,0,0,0,2,0,0), X4=(2,2,0,0,0,0,2,2), X5=(0,0,2,0,0,2,0,0), X6=(0,0,2,0,0,0,2,2). Let B2={X|X≧X2}, B3={X|X≧X3}, B4={X|X≧X4}, B5={X|X≧X5} and B6={X|X≧X6}. The system reliability Pr{B2∪B3∪B4∪B5∪B6}=0.987359625 by applying inclusion-exclusion rule. In the calculating process:

Pr{B2}=Pr{X≧(1,0,0,0,1,0,0,1)}=Pr{x1≧1}×Pr{x2≧0}×Pr{x3≧0}×Pr{x4≧0}×Pr{x5≧1}×Pr{x6≧0}×Pr{x7≧0}×Pr{x8≧1}=0.95×1×1×1×0.9×1×1×0.95=0.81225

Pr{B2∩B3}=Pr{(X≧(1,0,0,0,1,0,0,1))∩(X≧(2,2,0,0,0,2,0,0))}=Pr{X≧(2,2,0,0,1,2,0,1)}=0.623295

Pr{B2∩B3∩B4}=Pr{(X≧(1,0,0,0,1,0,0,1))∩(X≧(2,2,0,0,0,2,0,0))∩(X≧(2,2,0,0,0,0,2,2))}=Pr{X≧(2,2,0,0,1,2,2,2)}=0.5019165.

If d=8 and T is shrunk to be 9, then only 3 lower boundary vectors are generated: X3=(2,2,0,0,0,2,0,0), X4=(3,3,0,0,0,0,3,3) and X5=(0,0,2,0,0,2,0,0). The system reliability is decreased to 0.91275.

Figure 4:
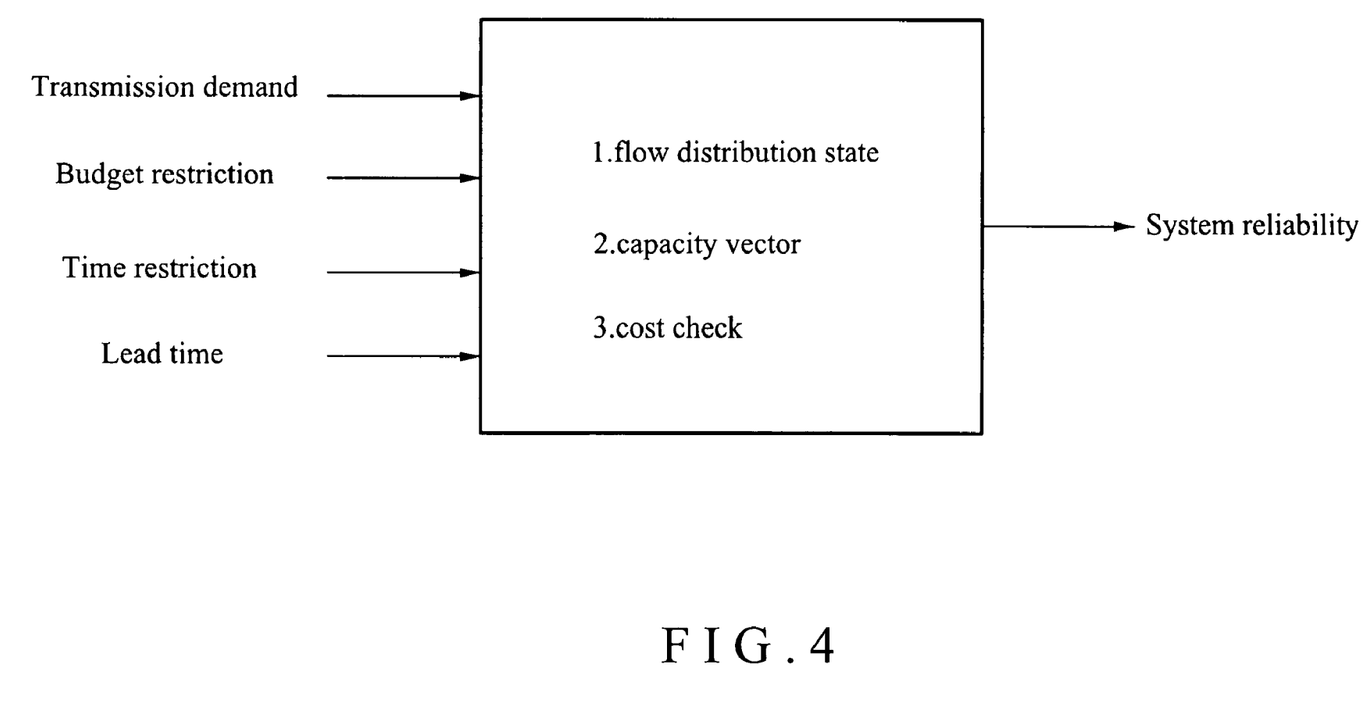
FIG. 4 is a block diagram of an embodiment of the system reliability evaluation method for transmission by a single minimal path in time restriction according to the present invention.

Referring to FIG. 4 for a network model according to the present invention, users need to input the transmission requirement d, the budget restriction B, the time restriction T and the lead time L. The lead time L depends on the processing time of the given amount of data in real-life flow network, such as computer system, telecommunication system, logistic system and transportation system. Based on the inputted data, the system reliability can be outputted in terms of flow distribution, budget check and time check.

Actually, the present method is suitable for the system with time and capacity characters, such as computer system, telecommunication system and transportation system. From the point of quality management, the system reliability can be regarded as a performance index.

The foregoing description of the preferred embodiment of the invention has been presented for purposes of illustration and description. It is not intended to be exhaustive or to limit the invention to the precise form or to exemplary embodiments disclosed. Accordingly, the foregoing description description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A system reliability evaluation method for transmission by a single minimal path in time restriction, using a computer containing an input unit, an operation unit and an output unit to execute a reliability evaluation software which provides a virtual network for simulating the flow network, the virtual network having a start node, a terminal node and plural arcs between nodes for constituting plural minimal paths, including the steps of:

inputting a transmission requirement, a budget restriction and a time restriction from the input unit by users;

defining the transmission requirement sent by a single one of the minimal paths of the virtual network;

defining a transmission time for the transmission requirement to be sent from the start node to the terminal node in the virtual network, wherein the transmission time is smaller than or equal to the time restriction;

according to the transmission requirement, the time restriction and the transmission time, calculating a maximum flow for each of the arcs of the minimal path per unit time, and defining the maximum flow as a capacity for each of the arcs;

defining a capacity vector composed by the capacity of each of the arcs, wherein the capacity is stochastic to correspond with the flow distribution state of the flow network;

defining a transmission cost for the transmission requirement to be sent from the start node to the terminal node in the virtual network;

executing a budget check by the operation unit to check if the transmission cost satisfies the budget restriction;

defining the capacity vector as a lower boundary vector when the transmission cost and the transmission time of the minimal path are less than or equal to the budget restriction and the time restriction respectively;

calculating the probability that the capacity vector of any path is larger than or equal to the lower boundary vector of the minimal path, called a system reliability of the flow network; and displaying the system reliability on the output unit.

2. The system reliability evaluation method for transmission by a single minimal path in time restriction of claim 1, wherein the steps of distributing the transmission requirement in the minimal path include:

selecting the minimal paths of the virtual network, wherein each minimal path is required to be an ordered sequence of the arcs between the start node to the terminal node without loops;

calculating a flow of each minimal path; and transferring the flow of each minimal path into the current capacity of each arc.

3. The system reliability evaluation method for transmission by a single minimal path in time restriction of claim 2, wherein the steps of calculating the flow of the minimal path include:

providing a lead time for each of the arcs of the minimal path, wherein the sum of the lead time for each of the arcs plus the result of transmission requirement divided by the flow of the minimal path equals to the transmission time;

with the transmission time lower than or equal to the time restriction, calculating the flow of the minimal path; and judging if the lower boundary vector exists, when the flow of the minimal path is smaller than a maximum capacity of the minimal path.

4. The system reliability evaluation method for transmission by a single minimal path in time restriction of claim 1, wherein the steps of the budget check include:

calculating the transmission cost of sending the transmission requirement in the minimal path;

comparing the numbers of the transmission cost and the budget restriction; and according to the comparison result, judging if the lower boundary vector of the minimal path exists.

5. The system reliability evaluation method for transmission by a single minimal path in time restriction of claim 1, wherein inclusion-exclusion rule, disjoint-event method or state-space decomposition can be applied in step of calculating the system reliability.

6. The system reliability evaluation method for transmission by a single minimal path in time restriction of claim 1, further comprising: defining an expectation of the transmission ability of the flow network as product of the system reliability and the transmission requirement.

7. The system reliability evaluation method for transmission by a single minimal path in time restriction of claim 1, further comprising: defining an expectation of the transmission time of the flow network as product of the system reliability and the time restriction.

* * * * *